United States Patent [19]

Miller

[11] Patent Number: 5,479,339
[45] Date of Patent: Dec. 26, 1995

[54] IRRIGATION CONTROL AND MANAGEMENT SYSTEM

[76] Inventor: Ralph W. Miller, 1675 Meadowglen La., Encinitas, Calif. 92024

[21] Appl. No.: 300,362

[22] Filed: Sep. 2, 1994

[51] Int. Cl.$^6$ .......................... G05B 11/01; A01G 27/00
[52] U.S. Cl. .......................................... 364/145; 364/420
[58] Field of Search ................................. 364/140, 141, 364/143–146, 156, 420, 510; 239/69, 70; 137/624.11–624.16, 624.18–624.2

[56] References Cited

U.S. PATENT DOCUMENTS

| | | | |
|---|---|---|---|
| 4,015,366 | 4/1977 | Hall, III | 364/420 |
| 4,176,395 | 11/1979 | Evelyn-Veere et al. | 364/420 |
| 4,709,585 | 12/1987 | Altenhofen . | |
| 5,229,937 | 7/1993 | Evelyn-Veere | 364/420 |

*Primary Examiner*—Roy N. Envall, Jr.
*Assistant Examiner*—Steven R. Garland
*Attorney, Agent, or Firm*—Baker, Maxham, Jester & Meador

[57] ABSTRACT

A system and method for providing cooperative control of irrigation between a groundskeeper having immediate supervision on plants to be irrigated and management personnel remotely located by using weather data and water budget restrictions. The system implements a method that involves responding to a signal from an atmometer that a predetermined "threshold" amount of water has been lost to evapotranspiration at or near an irrigation station. A daily total of these threshold signals are stored in a weather table for use in automatically determining a quantity of water that has been lost to evapotranspiration at the station since the most recent irrigation. The determined quantity is automatically combined with an evapotranspiration factor in order to determine how much water to replace. Alternatively, current data received from a remote site may used by the machine executed means to override the weather data table. An automatic check is performed to determine if the amount scheduled for application will exceed a predetermined budget based on historical weather data. If the budget is to be exceeded, an alert is sent via an attached display to an operator. The operator may use a keypad to instruct control logic to perform corrective action. If no corrective action is taken, then a "budget noncompliance" report is recorded in permanent storage for review by management personnel.

45 Claims, 7 Drawing Sheets

| 122 | 110 | 112 | 114 | 116 | | 118 | 120 |
|---|---|---|---|---|---|---|---|
| | $D_1$ | $D_2$ | $D_3$ | $D_4$ | | $D_{m-1}$ | $D_m$ |
| $ET_0 \rightarrow$ | 0.15 | 0.15 | 0.13 | 0.14 | | 0.11 | 0.10 |

FIG. 7

| 122 | 110 | 112 | 114 | 116 | | 118 | 120 |
|---|---|---|---|---|---|---|---|
| | $D_1$ | $D_2$ | $D_3$ | $D_4$ | | $D_{m-1}$ | $D_m$ |
| $ET_0 \rightarrow$ | 0.14 | 0.15 | 0.15 | 0.13 | | 0.17 | 0.11 |

FIG. 8

| 122 | 110 | 112 | 114 | 116 | | 118 | 120 |
|---|---|---|---|---|---|---|---|
| | $D_1$ | $D_2$ | $D_3$ | $D_4$ | | $D_{m-1}$ | $D_m$ |
| $ET_0 \rightarrow$ | 0.16 | 0.14 | 0.15 | 0.15 | | 0.16 | 0.17 |

```
                    STATION: 01 (RUNNING FEBRUARY)          —98

TOTAL RUN TIME (MINUTES): 10.85                   —100
          MINS PER CYCLE: 5                                 —102
          SOAK-IN TIME: 60                                  —104

INCHES: 0.36                            —106
                    % ET$_0$: 67                            —108
```

FIG. 10

```
          FEBRUARY BUDGET: 135984 GAL.                      —90

USE FROM START OF MONTH: 48733 GAL.               —92
          EXPECTED FOR FEBRUARY: 137471 GAL.                —94
          28-DAY W/CURRENT PROGRAM: 138036 GAL.             —96

WARNING. BUDGET WILL BE EXCEEDED. PLEASE          —97
          ENTER COMPLIANCE INSTRUCTIONS
```

FIG. 11

IRRIGATION CONTROL AND MANAGEMENT SYSTEM

BACKGROUND OF THE INVENTION

1. Field of the Invention

This invention relates generally to landscape and agricultural irrigation and more particularly concerns a machine executed method and system for irrigation control and management using weather data and water usage restrictions which results in a high level of usage efficiency and water conservation.

2. Description of the Related Art

Many attempts have been made in the past to provide reliable systems for maintaining an optimum amount of water in the soil for growing crops such as lawns, flowers, gardens and farm produce. Automatic systems are well-known which operate on a predetermined time sequence which may be adjusted for seasonal and atmospheric conditions. However, prior art irrigation systems have not generally combined weather data with water budget data to allow an operator to determine an optimum amount of water to apply at an irrigation station based on plant water replacement needs and water budget restrictions. Those systems which have employed some rudimentary form of budget control wherein central management personnel at a distantly remote central computer controls the amount of water allocated for a plurality of stations have an inherent disadvantage due to their inability to view the actual plant material. The viewing of the plant material gives a valuable feedback to the individual who makes the decision about how much water is to be applied but this visual feedback needs to be tempered with a budget requirement. Some prior art systems allow a plant viewing groundskeeper to call central management and request water to be applied at a certain location, but this is cumbersome and presents problems because of conflicts of interest between a manager who is concerned primarily with the cost of water and the groundskeeper who is concerned with plant appearance. Typically, a groundskeeper's or an operator's task has been to keep landscaping material looking healthy (e.g., keeping the grass green) but there is no balancing motivation to conserve water. Thus, the operator has no incentive to maintain a irrigation system at high operating efficiency and in good repair to limit and therefore conserve water. Unfortunately, even the best sensing and data collecting systems can be overcome by an operator who is motivated solely by the appearance of the plant. A further disadvantage of prior art systems that do not have a water budget allowance is that there is no motivation for the operator to be creative, for example, by selecting plant material that requires less water. It can be seen that a lack of cooperative control between central management and groundskeepers who can actually view the plants leads to unsatisfactory results.

An interactive irrigation control system is disclosed in U.S. Pat. No. 4,176,395 to Evelyn-Veere. The Evelyn-Veere patent concerns an irrigation control system and a related method for controlling valves in accordance with schedules of instructions. A general control system, such as the Evelyn-Veere invention, relies on the traditional method of sensing moisture in the soil for controlling the irrigation. A drawback of systems that utilize moisture sensing probes inserted into the soil is that they are usually insufficiently sensitive, especially at high moisture saturation levels. Still another problem with prior art systems that rely on moisture sensing probes in the soil is that it is exceptionally difficult to train poorly educated operators to have the skills needed for proper operation. Unfortunately, the Evelyn-Veere patent discloses no method or system for collecting and maintaining weather data at a station to be irrigated such that an irrigation station's water demands can be established from such data. Nor does the patent disclose the use of water budget restrictions combined with such weather data in order to conserve water while preserving the health of the plants.

Prior art systems have another drawback in that no corrective factor is made to account for the evapotranspiration characteristics of the plant material being grown or the efficiency of the water application device (e.g. a sprinkler or the irrigation system). Evapotranspiration (ET) refers to the amount of water a plant loses and needs to have replaced in order for the plant to maintain optimal growth. A reference value, $ET_0$, has been established for a particular type of plant—pasture-type tall fescue mowed to 4 to 6 inches in height and maintained in optimal condition. For example, if the $ET_0$ value is 0.20 inches, then pasture-type tall fescue mowed to 4–6 inches in height would need 0.20 inches of water for that day in order to maintain optimal growth. Other plants' water needs can be referenced as a percentage of $ET_0$ or % $ET_0$. Typically, most plants used for landscaping purposes require less water than tall fescue. This % $ET_0$ value is often called a crop coefficient factor or multiplier. For example, Bermuda grass uses about 60% of the water that the reference plant needs so its % $ET_0$ value is 60. Assuming that the $ET_0$ value for that day is 0.20 inches, then the Bermuda grass water needs are calculated as 60 percent of 0.20, or 0.12 inches. Since ET rates are different according to the type of plant, the rate of water lost is dependent on the type of plant. Prior art systems which rely on sensing soil moisture without accounting for the ET of a particular plant are not as accurate in determining the optimum amount of water to be replaced. Prior art systems that do not account for the efficiency of the irrigation system when determining how much water to apply by an irrigation station typically lead to inaccurate assessments of how much water is actually needed by or delivered to the plants or crops.

In the interest of completing the background of this invention, reference may be made to the following article, Hodel, "Quantify Accurate Irrigation Schedules with ET Data," California Landscaping, February 1994. This article explains how to use $ET_0$ data to determine irrigation water replacement needs. The article does not disclose an automatic system and method that combines weather data with water budget information to determine an optimum amount of water to apply.

SUMMARY OF THE INVENTION

Broadly speaking, this invention provides a system and method for allowing central management and local "on site" groundskeepers to cooperatively control and manage irrigation by using collected weather data and by providing motivation for an operator to stay within predetermined water budget restrictions.

A control unit having control logic and memory means is capable of responding to signals from a evapotranspiration sensing device, such as an atmometer, that indicates that a preselected amount of water relative to tall fescue has been lost to evapotranspiration at an irrigation weather station. The control logic converts the signal into a data element representing current weather data at the particular station being monitored. Each signal represents a predetermined amount of water so a running total of the number of signals indicates how much water has been lost to evapotranspiration in a given period of time. Alternatively, such weather data may be received from an outside remote weather data receiver and communicated through a modem or other communication adaptor to the control unit. The control logic stores the total in a current weather data table in memory.

The control logic uses the current weather data table to determine a quantity of water to apply at the station. Alternatively, remotely gathered data may be used by the logic to override the current data. Further, the invention enables the use of back-up historical data collected from a database which can be used to create a historical weather data table useful for establishing water needs when the current data is unavailable. The control logic further uses an operator entered schedule to project the amount of water to be used within a predetermined period by combining the schedule information with historical weather data. This projected usage is compared to a predetermined budget amount for the period. If the amount exceeds a predetermined budget amount, then a groundskeeper or operator is alerted through an attached display. The alert serves to encourage the operator to take water off of at least one station, in order to maintain a budget for all the station's within the controller's control area. The operator may then use input means, such as a keypad, to take corrective action to command the control unit to cause the water to be applied in accordance with the budget. If an operator does not issue compliance instructions, a message indicating noncompliance is placed in a log stored in permanent storage. This log may be used by management personnel to ensure operator compliance to budgets.

The predetermined amount of water is applied through an irrigation head when a control valve is placed in an open state by the control logic. Using a irrigation rate stored in a read and write storage device, the control logic determines a run time. The control logic then may divide the run time into individual periodic cycles. This allows for the soil and plant material to absorb water between applications. In this way water is not wasted.

BRIEF DESCRIPTION OF THE DRAWING

The objects, advantages and features of this invention will be more readily perceived from the following detailed description, when read in conjunction with the accompanying drawing, in which.

DESCRIPTION OF THE PREFERRED EMBODIMENTS

Figure 1:
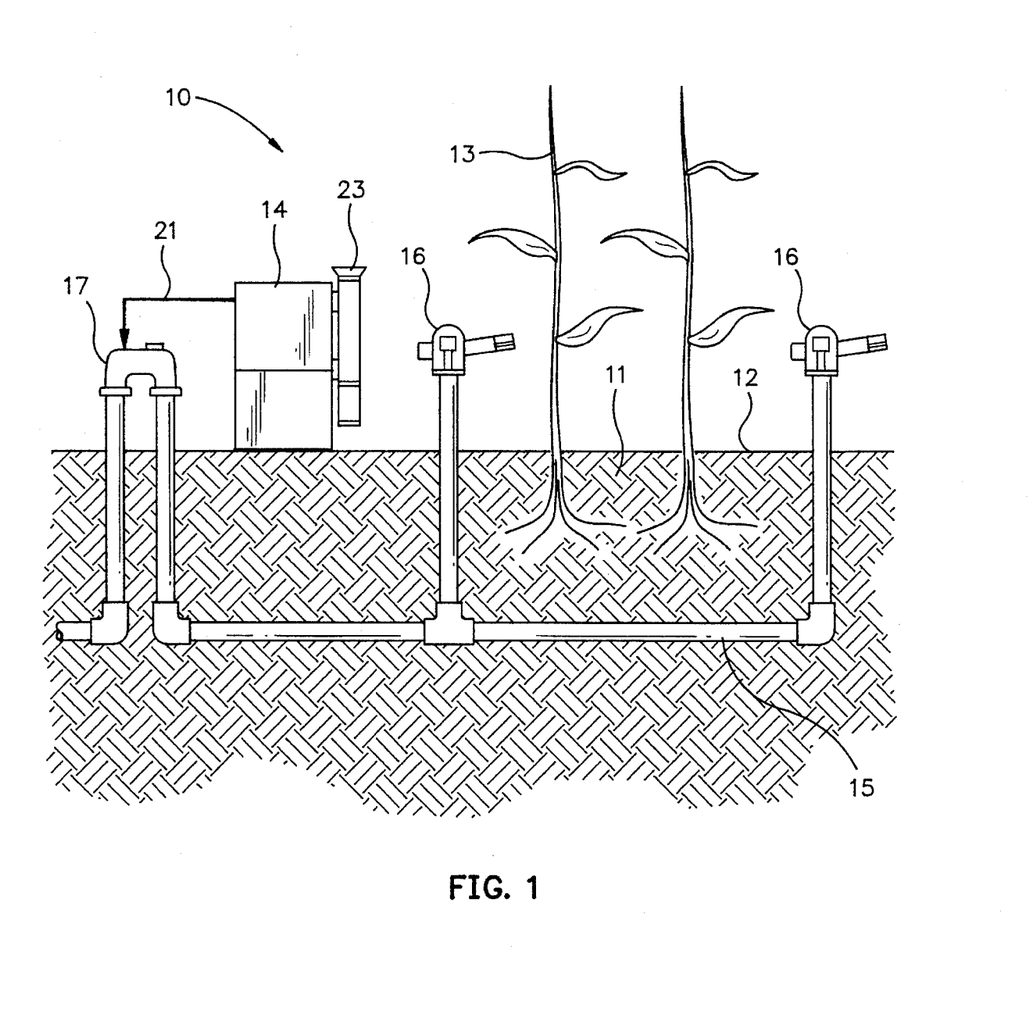
FIG. 1 is a schematic illustration of a portion of an irrigation system embodying the present invention.

With reference now to the drawing and more particularly to FIG. 1, the ground or soil is represented by reference numeral 11, having top surface 12 in which a desirable crop of plants 13 has been planted and is growing. The irrigation system comprises control unit 14, evapotranspiration sensing device 23, piping 15, and dripper or sprinkler irrigation heads 16. Control valve 17 is representative of any suitable control valve system or valve arrangement regulated by control unit 14 through electrically conductive or pneumatic line 21. Although an evapotranspiration sensing device is preferred, any device which can provide weather data is acceptable for implementing the present invention. For example, weather information can be derived from humidity or temperature data; however, an evapotranspiration sensing device is an extremely accurate gauge for determining water replacement needs and is therefore preferred. The evapotranspiration sensing device 23 is preferably an atmometer. An atmometer is a well-known instrument for measuring the evapotranspiration rate for tall fescue grass and therefore does not have the disadvantages associated with moisture sensing probes which go into the soil as is typically done in prior art irrigation systems. The atmometer 23 senses the evapotranspiration rate for tall fescue at the irrigation station 10. The station is comprised of the plant material 13, the soil including soil top 12, sprinkler 16 and control unit 14. The station denotes the area onto which water from the sprinkler is to be applied.

Figure 2:
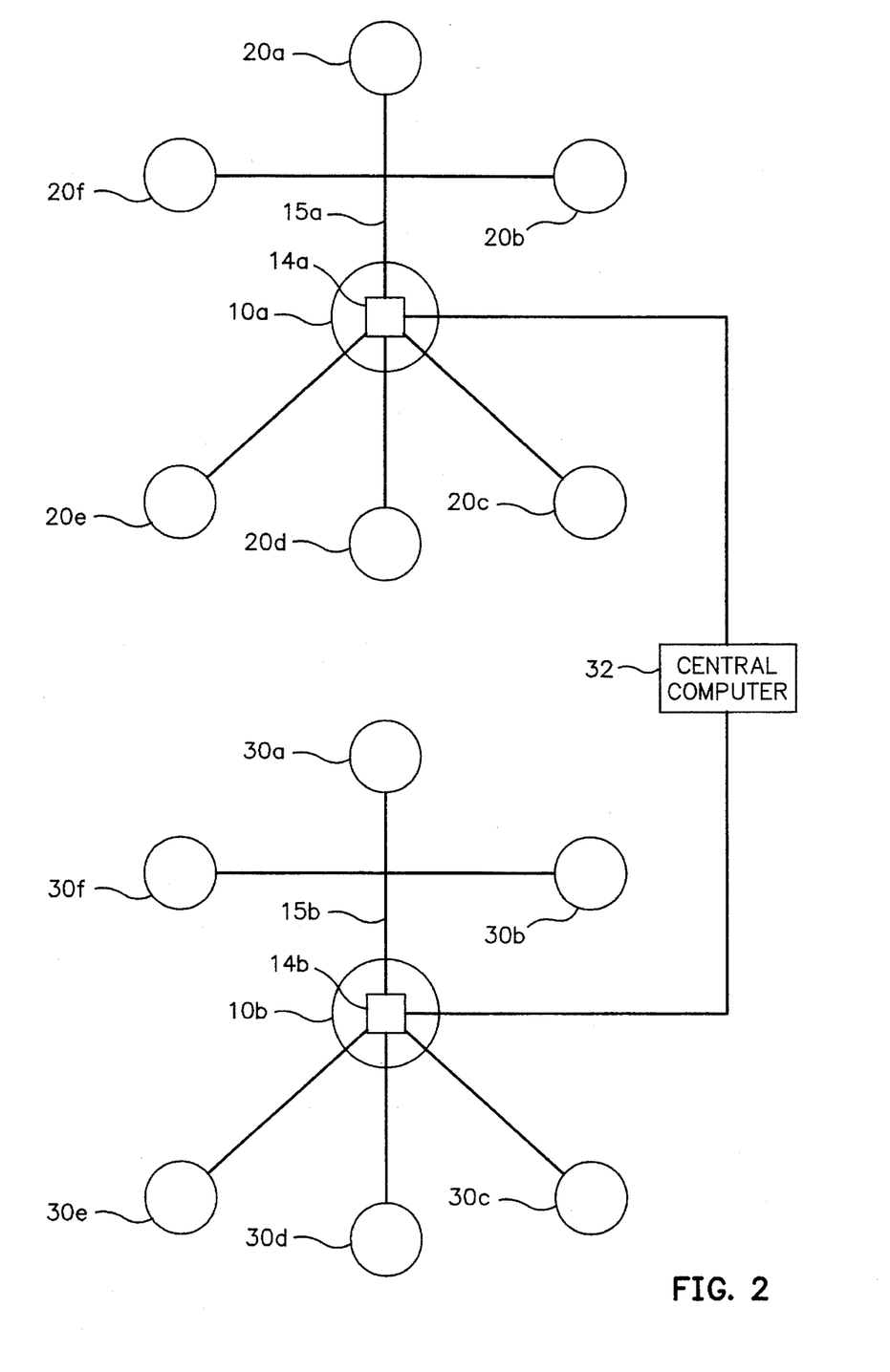
FIG. 2 is a schematic illustration of an irrigation system employing the portion shown in FIG. 1.

Referring to FIGS. 1 and 2, control units 14A–B are each identical to control unit 14 described above. In a similar fashion, stations 10A–B, and piping 15A–B, are each identical to station 10 and piping 15, respectively. In a preferred embodiment, one evapotranspiration sensing device 23 and control refit 14A, may serve a plurality of stations 20A–F which are identical to station 10A, except these plurality of stations are not equipped with a control unit or evapotranspiration sensing device and may apply water to plant material which is different from plant material 13. It should be noted that the sensing device 23 is shown placed at station 10 because that is a convenient arrangement; however, the sensing device may be placed remote to all the stations including station 10, as long as the weather data collected is accurate for the stations (i.e. the weather is the same at the sensing location and the stations). Control unit 14A is provided with a predetermined budget or water allowance which is preferably based on historical water usage data. The budgeted amount represents a cumulative value which can be allocated to all stations (10 and 20A–F) under the control of control unit 14A. Accordingly, the operator may distribute the budgeted water across all stations according to his visual impression by seeing the actual plant but balanced by the budget restrictions imposed. A central computer 32 is in communication with the control unit 14A, and therefore can be used by central management personnel to oversee the groundskeeper who operates the control unit. Thus, control is given to the local groundskeeper for maintaining the health of the plants and conserving water while he is held accountable to management so that cooperative control is enabled by the present invention. Communication between the central computer and the control units may be provided in a number of ways which include using radio frequency waves, or by providing signals through a data cable connected to a known laptop computer through an interface at the control unit, or by using communications lines such as existing telephone lines and providing signals to the control unit.

In a preferred embodiment, a single control unit, such as control unit 14A, has control for up to 40 stations, typically covering one to two acres of land, although fewer stations are shown in the illustration for the sake of simplicity. The central computer 32 is also in communication with other control units, such as control unit 14B at station 10B, which is connected by piping 15B to stations 30A–F. Generally the system controlled by control unit 14B is identical to that controlled by control unit 14A. A central computer, such as central computer 32, may maintain communication with several control units, such as control units 14A and 14B, each control unit enforcing a budget for a plurality of irrigation stations.

Referring again to FIGS. 1 and 2, the control unit 14 controls the application of water at irrigation stations under its control by using evapotranspiration data gathered by sensing device 23. As mentioned above, the sensing device is preferably designed to consume water at the same rate as the evapotranspiration rate of tall rescue grass. In this way, $ET_0$ data is gathered in a real-time fashion at control unit 14 from signals sent by evapotranspiration sensing device 23. This $ET_0$ data may then be adjusted by a % $ET_0$ factor for each irrigation station according to the station's crop coefficient exposure and soil conditions, and preferably a multiplicative factor to account for the efficiency of the sprinkler system at each station. For example, if the crop coefficient for Bermuda grass is 60% and the efficiency rating is 80%, then an appropriate % $ET_0$ factor is determined by dividing the crop coefficient by the efficiency rating, yielding 75%. In other words, the Bermuda grass would require 75% of the $ET_0$ value for the station, rather than the normal 60%, to compensate for the less than 100% efficiency of the sprinkler system.

In normal operation, the irrigation control system of FIG. 1 would be calibrated so that when it is time to irrigate, water is called for and control unit 14 opens valve arrangement 17 to apply water to the soil until a predetermined amount has been applied. At that time, the control unit would respond by turning off the power to the valve which results in turning off the source of water to the sprinkler.

Figure 3:
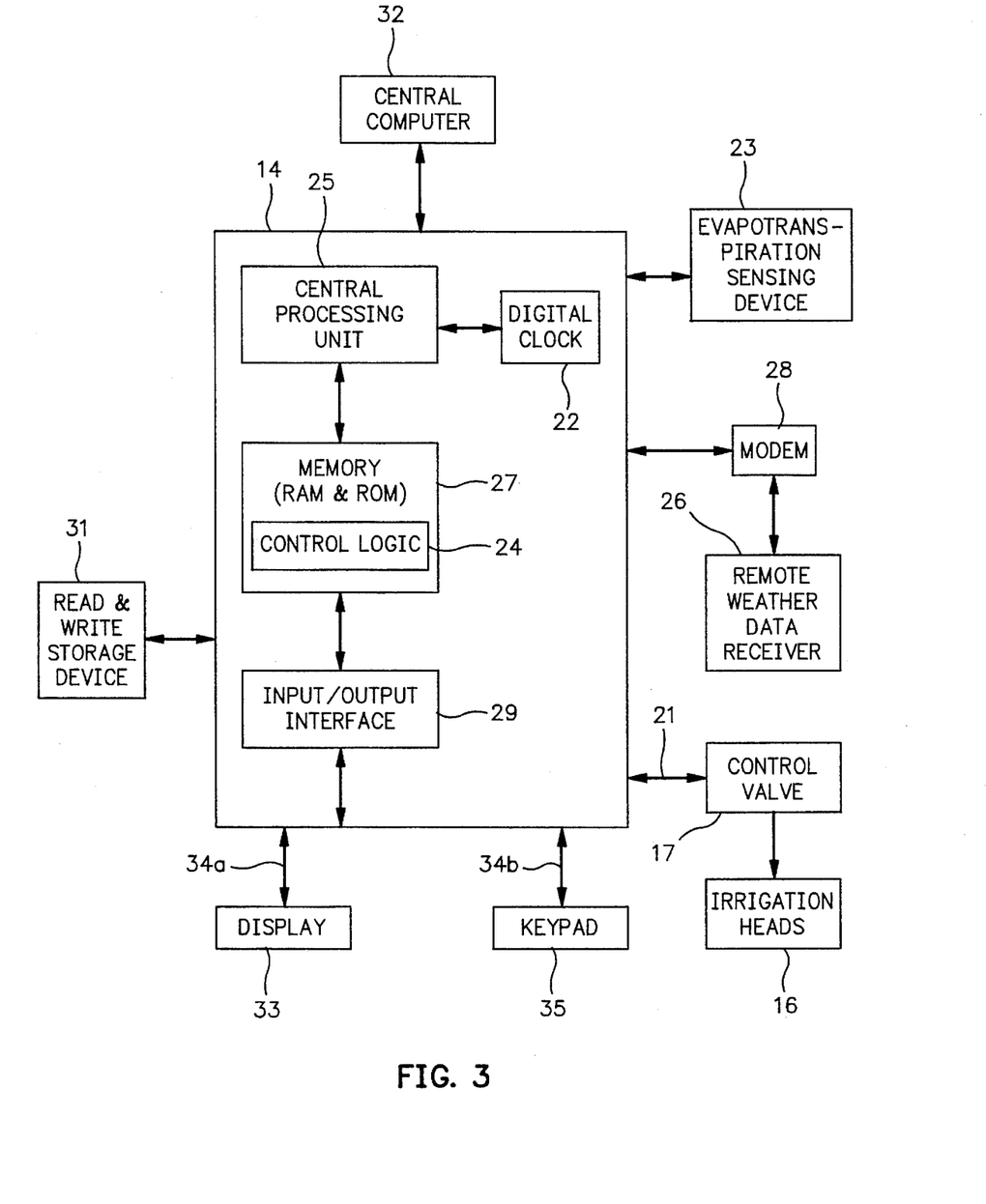
FIG. 3 is a block diagram of a control system embodying the present invention.

Referring now to FIG. 3, a block diagram of control unit 14 and attached devices for irrigation shows that the control unit comprises a central processing unit (CPU) 25, memory means 27, including random access and read only memory, and control logic 24 stored in the memory means. The CPU may be a conventional microprocessor, such as an Intel 80-386. Further, the control unit comprises Input/Output (I/O) interface 29 for communicating with outside devices through a conventional address and data bus, such as bus 34a and bus 34b. The control unit is in communication with central computer 32, which in a preferred embodiment, is a well known conventional personal computer. The control unit is attached to operator communication means comprising a display 33 and keypad 35 to allow an operator to receive and send information, respectively. Although a keypad is shown as the preferred embodiment for sending information, the inventor recognizes that other means, such as a radio or interface to a known laptop computer (e.g., an RS-232 interface), could be used for the operator to communicate with the control unit. The inventor also recognizes that similar means could be used to send information to an operator without the need for display 33, but the display is preferred because of the convenience it provides. A read and write storage device 31, such as a hard disk or an erasable programmable read only memory (EPROM) integrated circuit chip, is used to store data collected by evapotranspiration sensing device 23. Further, weather data may be received off site and communicated through a modem 28 or other well known type of communications adaptor (not shown). Remote weather data receiver 26 may receive data via a radio or other known transmitting means, or through telephone lines, or through direct hard-wired communications with an off-site computer.

Referring again to FIG. 3, the control logic may be used in an automatic mode to control valve 17 through electronic or pneumatic lines 21. Control valve 17 serves a gating function allowing or blocking water passage to irrigation heads 16. The control logic may be a software program or may be, hard-wired electronic logic circuitry. Further, the control logic could be implemented as microcode stored in a microprocessor. Such a software program or microcode is implementable by one skilled in the art by reference to the flow diagrams of the logic shown in FIGS. 4 and 5 and discussed below. In an automatic mode, current weather data is accumulated. A preferred method of accumulating this data employs a current weather data table which is built from signals from evapotranspiration sensing device 23 that are converted to data elements, although any form of accurate accumulation will work with the present invention. The current weather table is used to automatically control water demand by determining the amount of water to apply to irrigation head 16. Alternatively, current weather data may be received through modem 28 or a similar communications adaptor and can be used to override stored weather data. Note that several valves 17 may be controlled by control unit 14, and that each valve 17 may individually control several sprinkler heads 16.

This current weather data is then used to determine exactly how much water to apply at one or more irrigation stations under the control unit's control. The current weather data ensures that weather values, such as the correct $ET_0$ values, are used to determine current water replacement needs. Additionally, this system and method provides a heretofore unknown way of balancing projected water usage against water conservation requirements. Preferably, projected needs are automatically determined by combining at least one value in an operator inputted schedule with a historical weather data accumulation. The water conservation method of the present invention is implemented by control logic 24 comparing projected water demands for a predetermined period to budget information for that period that is stored on storage device 31. Such a budget is preferably based on historical weather data. If demand exceeds a predetermined budgeted amount, then a groundskeeper or operator is alerted through display 33. The operator may then use keypad 35 or other type of input means (e.g. radio communications, discussed above) to communicate redirection of water or blockage of water from control valve 17. In this way, the operator may comply with the budget. If the operator does not comply with the budget, a message is placed in a control log for management inspection. Thus, the operator is motivated to comply with the budget based on historical weather, while the system and method allows the determination of the precise water to be replaced based on rite current weather.

Figure 4:
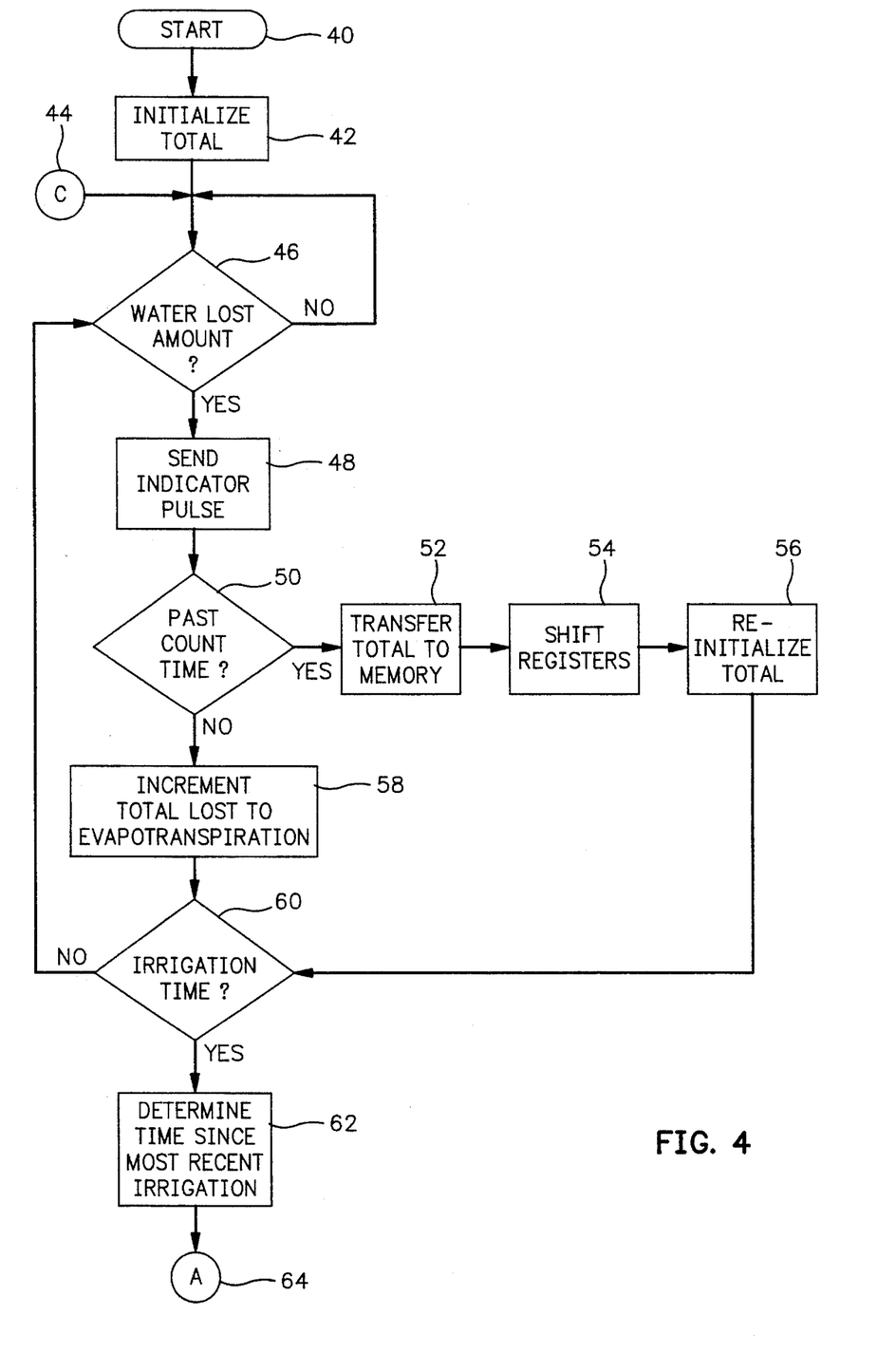
FIGS. 4, 5, and 6 are flow diagrams of the method of the present invention.
Figure 5:
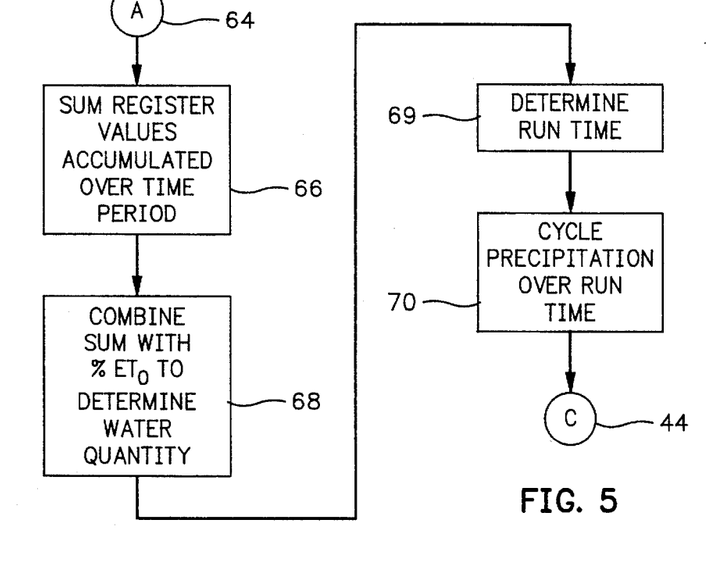

Referring to FIGS. 3, 4 and 5, a flow diagram is used to show steps employed by control logic 24. The program begins execution at start step 40. Control logic or program 24 initiates a value, $ET_0$, representing the total amount of water lost to evapotranspiration for reference tall rescue at sensing device 23 to a value of zero. The value for $ET_0$ is initially set to zero in step 42 so that pulses indicating that a predetermined amount of water has been lost to evapotranspiration may be summed to arrive at a final or total $ET_0$ value. The initialization ensures that old values representing the total $ET_0$ for a preceding day are transferred to the weather history table. Step 44 is a continuation step that coincides with the end of the flow chart steps shown in FIG. 5 (discussed below), to show that processing branches back to the flow steps shown in FIG. 4 once FIG. 5 illustrated steps are complete. Referring to steps 46 and 48, evapotranspiration sensing device 23 sends a pulse to control unit 14 when a predetermined incremental amount of water has been lost to evapotranspiration. For example, a predetermined incremental amount may be 0.01 inches. If the predetermined amount has been lost to evapotranspiration, then an indicator pulse is sent by device 23 to logic 24, as shown in step 48. Digital or analog clock 22 connected to central processing unit 25 is called upon by logic 24 to determine if it is past a predetermined time that indicates it is time to stop counting pulses. For example, the predetermined count time may be 8:00 p.m. If it is not past 8:00 p.m. then the real-time $ET_0$ value is incremented by an amount of water lost to evapotranspiration at sensing device 23. Generally, the total count time value of $ET_0$ can be determined by the mathematical relationship, where the familiar chemical symbol for water, $H_2O$, is used to denote the amount of water lost to evapotranspiration at sensing device 23:

$$ET_0 = \sum_{i=1}^{Y} (H_2O)_i$$

In the above equation, Y represents the total number of signals received prior to passing the predetermined count time. Thus, the real-time $ET_0$ value is continually incremented as long as evapotranspiration signals are received and it is not past the count time.

For example, employing the numbers previously given, if it is not past 8:00 p.m., then $ET_0$=0+0.01 or 0.01 inches from the first pulse count. If the answer to the inquiry in step 50 had been "yes", i.e., it is past 8:00 p.m., then the $ET_0$ value is transferred to memory. The memory selected could be either random access memory 27 or permanent storage device 31. However, due to the volatility of random access memory, it is preferable to store the $ET_0$ value in permanent storage. The value, $ET_0$, is stored in a current weather data table that contains weather data collected at the station to be irrigated for a predetermined period of time. Of course, a table is a convenient choice for keeping up with changes in the weather, but the inventor recognizes that any form of an accumulator that is capable of accounting for the weather data will work with the present invention. On any given day, prior to the predetermined time (8:00 p.m. in this example), historical data collected over time may be used to represent that particular data. Such historical data is usually available from a government agricultural assistance program. For example, in California, a state-wide system of computer-driven weather stations (CIMIS) generate $ET_0$ values on a daily basis. Historic $ET_0$ data is 30–40 year averages of such accumulated real-time $ET_0$ data. This data can be used as a best guess for estimating the $ET_0$ value on a given day, when actual numbers are not yet available. Of course it will be readily appreciated that historical $ET_0$ data is less accurate than real-time $ET_0$ data collected at or very near the stations to be irrigated.

Figure 7:
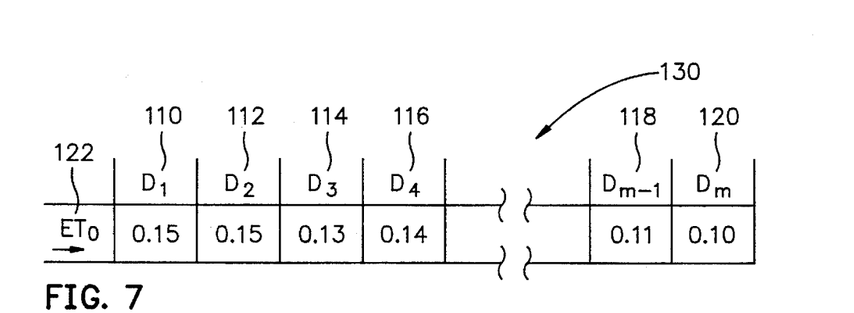
FIG. 7 is a specific example of a weather data table useful as a part of the present invention.

Referring to FIG. 7, such a weather data table is shown. Table 130 is comprised of real-time $ET_0$ data gathered from sensing device 23. Of course, the table could consist of only historical data collected over time and averaged, rather than real-time $ET_0$ data. This is an option that is more convenient, but sacrifices accuracy. Alternatively, the table could consist of only real-time $ET_0$ data without using historical data. This is an option that is accurate but is prone to problems if current weather data can not be collected. The present invention enables the combination of a convenient historical weather table with more accurate current weather or $ET_0$ data gathering capabilities to sequentially replace historical weather data over time. Eventually all of the historical weather would be replaced, assuming that there were no malfunctions during collection. If there were malfunctions, then historical weather data could be used instead of current $ET_0$ data. Thus, in a preferred embodiment Table 130 represents data elements stored in a register in memory means 27, where each element in row 122 represents real-time $ET_0$ data. An exception to a data element representing real-time $ET_0$ data is the situation when $ET_0$ has not been yet determined for a given day. In that case the data element represents historical data, which is replaced once $ET_0$ is determined. For the sake of simplicity, assume that the values in row 122 in Table 130 each represent real-time $ET_0$ values determined after the predetermined count time (e.g. 8:00 p.m.). The columns are used to indicate a particular time period over which the $ET_0$ data was collected. Thus, 0.15 shown in row 122, and column 110 indicates that 0.15 inches of water has been lost to evapotranspiration in a time period designated as Dr.

A convenient choice for each time period denominated in columns 110–120 and designated as $D_1$ through $D_m$ is from 8:00 p.m. of a calendar day through 8:00 p.m. of the next calendar day. The historical $ET_0$ value is available for use for any calendar day, until it is replaced by a new collected $ET_0$ value at 8:00 p.m. Irrigation may occur while measurements are accumulated, but care must be taken to place the measurement device so that it does not get wet from the irrigation. The amount of time to irrigate varies according to factors previously described. For example, irrigation may take 7 to 8 hours around Los Angeles, Calif. but up to about 20 hours in Las Vegas, Nev. Thus, $D_1$ represents the first day of the overall measurement period kept in the weather table and $D_m$ represents the last day. A good choice for $D_m$ coincides with the 28th day. In this way the current weather table can be closely aligned with historical values which are usually kept on a calendar basis by month and day. Following this example, $D_2$ shown in column 112, or the second day of the overall measurement period for the table, is 0.15. In columns 114–120, the $ET_0$ values, 0.13, 0.14, 0.11, 0.10 correspond respectively to the designated days indicated in each column.

Figure 8:
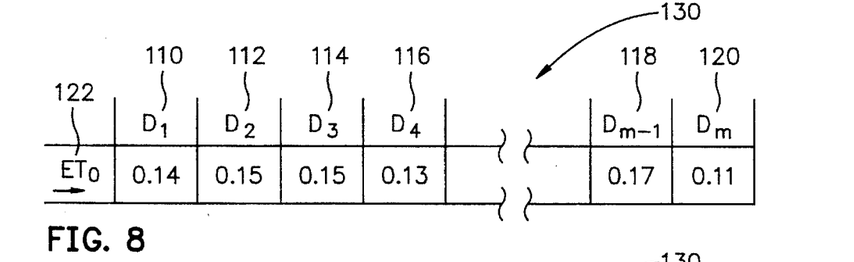
FIGS. 8 and 9 are further specific examples of the weather data table of FIG. 6 illustrating the accommodation of new data.
Figure 9:
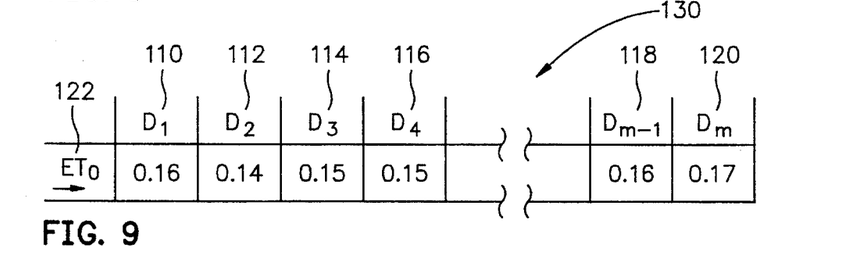

Reference is now made to FIGS. 4, 8, and 9. When a new day's total is stored in memory it becomes necessary to shift the storage registers to accommodate the new day's total, as shown in step 54 of FIG. 4. This may be best understood by reference to examples in FIGS. 8 and 9. Weather table 130 is shown in FIG. 8 having example data elements collected from the evapotranspiration sensing device. The values in the table correspond to how much water has been lost to evapotranspiration in the sensing device 23, and therefore represent $ET_0$ values because the sensing device emulates the evapotranspiration characteristics of pasture-type tall fescue. Referring to data elements having indices row 122, and columns 110, 112, 114, the following data element examples are shown. In row 122, column 110, the data value 0.14 represents the amount of water lost to evapotranspiration during day $D_1$. Similarly, in row 122, column 112, 0.15 represents the total amount of water lost to evapotranspiration in day $D_2$. Finally, in row 122, column 114, 0.15 represents the amount of water lost to evapotranspiration during day $D_3$. In column 122, row 118, 0.17 represents the total amount of water lost to evapotranspiration during day $D_{m-1}$. In row 120, column 120, 0.11 represents the total amount of water lost to evapotranspiration during day $D_m$. When new totals are added to memory (as shown in step 52 of FIG. 4) then it becomes necessary to shift values stored in data registers. Referring to FIG. 9, weather data values will be seen to have shifted globally to the next incremented time period. For example, in row 122, column 112, 0.14 represents the total amount of water lost during the day $D_2$. Note that in FIG. 8, 0.14 referred to the total amount of water lost during day $D_1$. Thus, for example, $D_2$ represents the second day and $D_1$ represents the first day after the most recent irrigation. For another example, in row 122, column 114, 0.15 represents the total amount of water lost during day $D_3$. Note that 0.15 represented the amount of water lost on day $D_2$ before registers were shifted in the example case (FIG. 8). Thus, data values have been shifted one storage register by control logic 24 to account for new data collected over time. Finally, for another example, note that in row 122, column 120, 0.17 now represents the amount of water lost in time period $D_m$ since the last irrigation. The value, 0.11, previously shown for day $D_m$ (in FIG. 8) is no longer stored in the data table since it is now outside the total measurement period accounted for by the weather table.

Referring to FIGS. 4, 5 and 9, after all registers have been shifted, then totals are reinitialized, as shown in step 56. In step 60, clock 22 is checked to see if it is time to irrigate. Whether it is time to irrigate preferably depends on a predetermined clock time or a preset interval which may also, be reflected in clock time. Although there can be many ways to decide when it is time to irrigate, it is preferred that the time be predetermined according to scheduled activities. For example, a municipality may schedule irrigation to occur on a city maintained sports field when the home team is away. It should be noted that since many stations may be controlled by one control unit, each station may have its own independent frequency of irrigation but the overall cumulative budget is still maintained by the control unit for all stations under its purview. If it is not time to irrigate the control logic returns to step 46, and steps 48, 50, 52, 54, 56 and 58 are repeated. However, if it is time to irrigate, the control logic determines how long it has been since the most recent irrigation at the station. Referring to FIG. 5, step 64 continues into the next step 66. The register values in the historical weather data table 130 are accumulated over the time period corresponding to the most recent irrigation. Referring once again to FIG. 9, for example, in row 122, column 110, 0.16 represents the total amount of water lost to evapotranspiration as measured at sensing device 23 during day $D_1$. Thus, the $ET_0$ value 0.16 is the amount of units (e.g., inches) that have been lost to evapotranspiration over a one day period. Following this convention, then 0.14 inches is the amount of water that has been lost to evapotranspiration during the second day following the most recent irrigation (row 122, column 112). Finally, it can be seen that in row 122, column 114, 0.15 inches has been lost during the third day following the most recent irrigation. Thus, if the control logic determines that it has been three days since the most recent irrigation, then the program sums the values, 0.19+0.20+0.15, yielding 0.54 total inches having been lost to evapotranspiration, and this is the $ET_0$ value that is used to calculate how much water to replace at a particular irrigation station. At the predetermined time to irrigate, the system commences irrigation to replace the water lost by evapotranspiration.

Referring once again to FIG. 5, as shown in step 68, the values summed are combined with the percent evapotranspiration factor, % $ET_0$. This determines the amount of water which must be replaced for optimum plant growth. As described above, the % $ET_0$ adjusts for the crop coefficient and sprinkler system efficiency. If the percent $ET_0$ factor is 67%, for example, then the control logic multiplies the summed register value to determine a quantity of water to replace. The control logic 24 multiplies 0.67 times the summation of the register value, 0.54, yielding 0.36 inches of water to replace. After step 68 is complete, then an irrigation head run time is determined by control logic 24, in step 69. The run time refers to the amount of time that the irrigation head will actually deliver water to an irrigation station, such as irrigation station 10 or one of the plurality of stations 20A–F. The run time is determined based on the application rate of the irrigation head and the amount of water to be replaced, as determined in step 68. The application rate is preferably stored in storage device 31, and may be retrieved by logic 24. The quantity of water to be replaced is divided by the application rate. For example, if the application rate is 2 inches per hour, the run time will be determined automatically by control logic 24 as follows. Applying the values from the previous example to illustrate, 0.36 inches divided by 2 inches per hour yields 18.1% of an hour or 10.85 minutes of run time.

Figure 10:
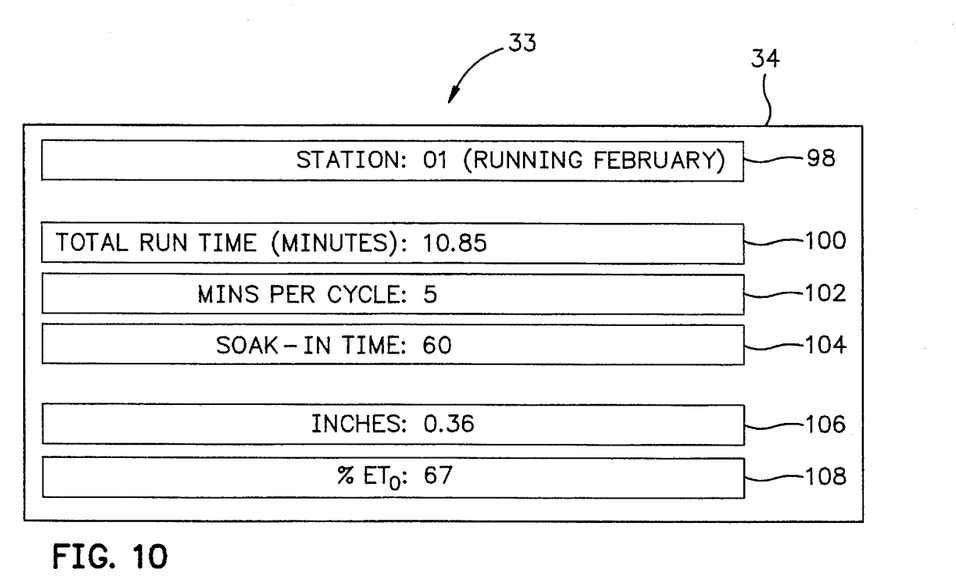
FIGS. 10 and 11 are examples of display screen outputs used in the present invention.

Referring to FIGS. 4, 5, and 10, an operator may be alerted of this information by display means 33 on display screen 34. Display field 98 shows that station 1, running a February schedule, is to be irrigated. The total run time as calculated in the above example is 10.85 minutes, as shown in display field 100. Referring once again to FIG. 5, after the run time has been determined, the water application by the sprinkler may be cycled over intervals of the run time, as shown in step 70. Control logic 24 issues signals to open and close control valve 17 in order to cycle the amount of precipitation according to a predetermined time based on the ability of the plant material 13 and soil 11 to absorb water. For example, a predetermined cycle time of five minutes is shown in display field 102 of FIG. 10. Also, a soak-in time of 60 minutes is shown in display field 104. Thus, using the above example, if the cycle time is five minutes and the run time is 10.85 minutes, then there will be three repeats. This allows time is given for the water to be soaked in before more precipitation is applied. In this way, wasteful water runoff is reduced, and in some cases eliminated. Control in the flow diagram now returns to step 44 as shown in FIG. 5. Step 44 shows that processing returns to the flow path shown in FIG. 4, as steps 46 through steps 70 are continuously executed, as long as the irrigation system is in operation. Of course the irrigation system may be taken out of operation for repairs and in that case the processing shown would be interrupted. Since the interruption can occur at any point in the process, an interruption step is not shown.

Figure 6:
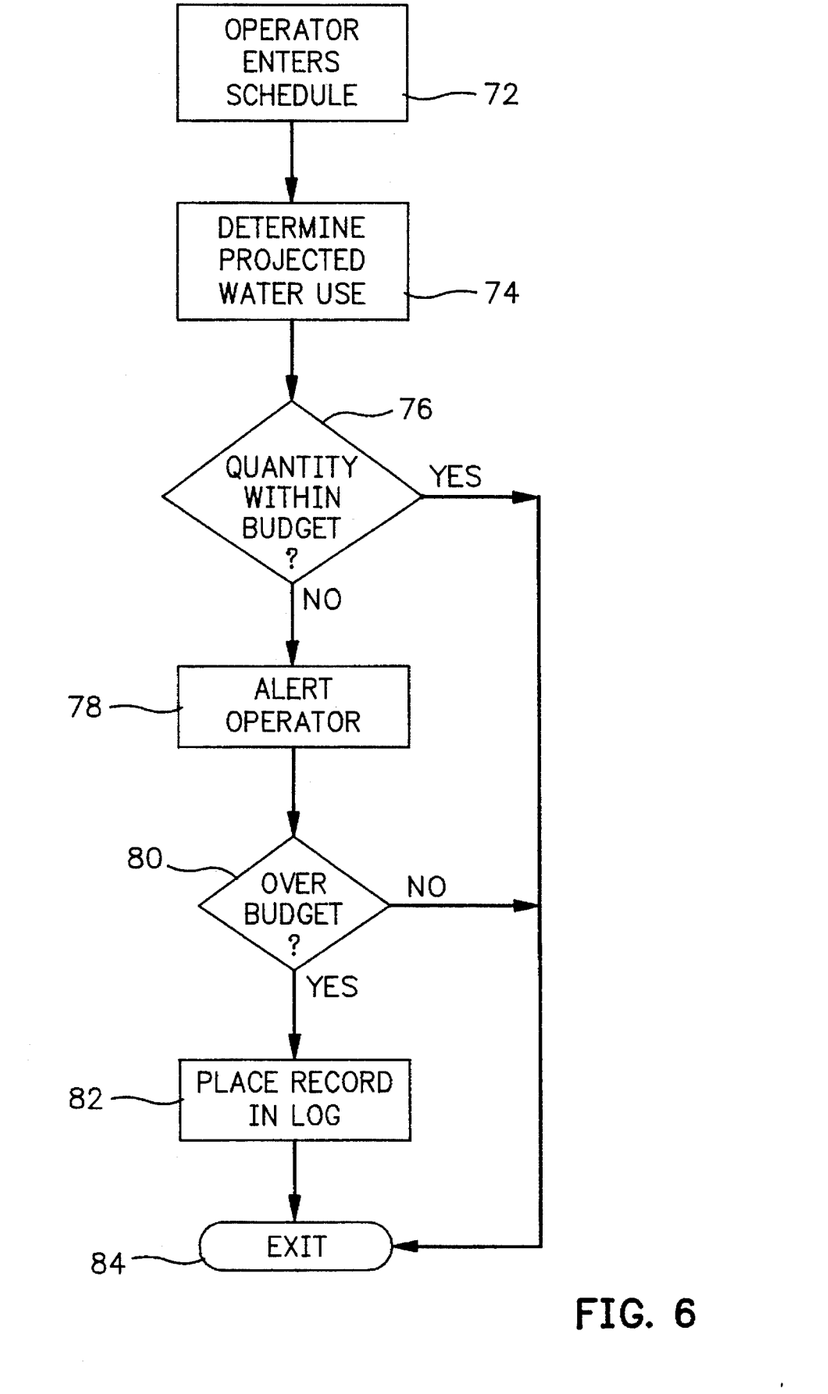

Referring to FIG. 6, an operator inputted schedule is used to determine projected water usage which is compared to a budget allowance. In step 72, an operator may input a schedule based on % $ET_0$, which the controller may use to combine with historical weather data to determine a projected amount of water that should be replaced. Such an operator entered schedule may contain values in terms of a depth of irrigation water to be accumulated (e.g., inches) or time to irrigate (e.g., minutes). But in any case, whether the inputted schedule values are entered as % $ET_0$, depth, or time, these values are combined with historical weather data to determine the projected water usage for a particular period in the immediate future. In step 74, the projected use of water is determined based on operator input to controller 14. In step 76, the predetermined budget is compared to the projected water use. In step 78, the operator is alerted via the display 33 if the projected water use is within budget requirements. An example of an alert indicating that the budget will be exceeded given the $ET_0$ data is discussed below.

Figure 11:
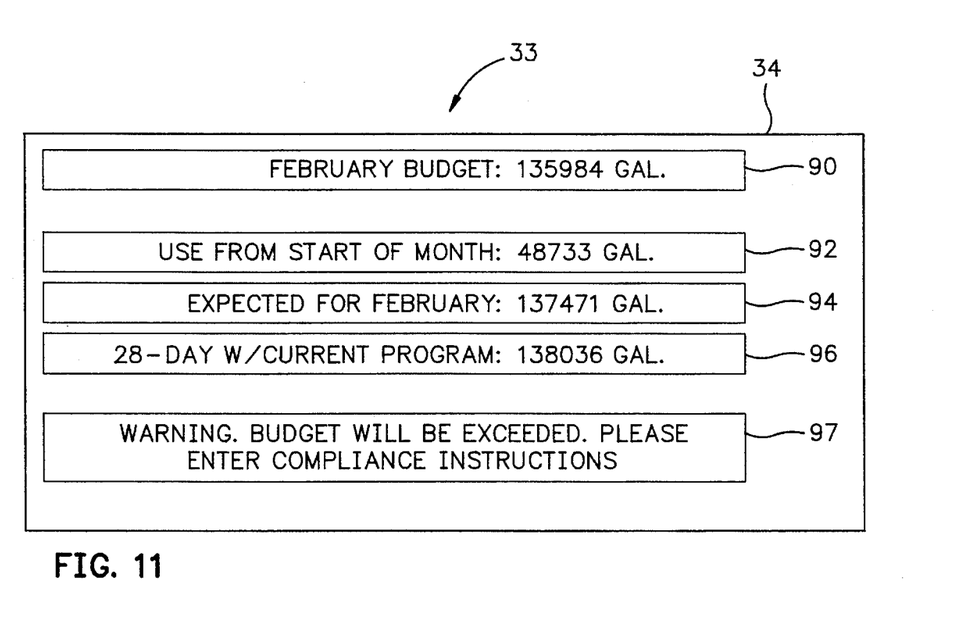

Reference is made to FIGS. 4, and 11 below. Before applying the water, the control logic 24 checks to see if the quantity of water requested by an operator program which the operator entered at control unit 14 will fit within a budget for a total time period, such as the time period represented in weather table 130. Referring to FIG. 11, an example of such a budget is shown in display field 90 of display screen 34 of display 33. For example, for the time period represented by the month of February, the budget is allocated as 135,984 gallons. As shown in step 96, 138,036 gallons will be replaced following the current program for a 28 day period. Given the current, it program, the control logic recognizes that the budget will be exceeded. Accordingly, the logic sends an alert signal for the operator. An example of such an alert is shown in display field 97. It is envisioned that the present invention can be programmed to give other useful information which can be available to an operator or central management personnel. Such information may include the following examples. For one example, wherein the accumulated amount of water replaced to date is shown in display field 92 as 48,733 gallons. For another example, a predetermined amount expected is shown in display field 94 as 137,471 gallons.

Now returning to FIG. 6, as shown in step 78, if the budget is to be exceeded based on the projected water usage, an operator alert indicating this is sent to the operator on display 33. The operator is given a chance to command the control logic to direct compliance with the budget through input means, such as keypad 35. Thus, the alert signal from logic 24 motivates the operator to take water away from one irrigation station to maintain the allocated budget for all the stations under the control of one particular control unit. In step 80, the control logic checks to see if the operator has complied with the budget, or if he has left the controller in an "over-budget" condition. If the operator leaves the control logic in an over-budget condition for some predetermined time (e.g. 10 minutes), a record is placed in a log for central management review, as shown in step 82. The log refers to a stored message retrievable by someone given arrangement authority to oversee the operator. The log is preferably stored on storage device 31. Processing ends in step 84, following either step 76, 80 or 82 according to the answers to the inquiry statements shown in step 76 and 80. Thus a motivation, other than to simply keep the plant healthy looking, is given to an operator, and the result is savings of water. The above described technique enables cooperative control by central management and a local groundskeeper in a heretofore unknown way.

In view of the above description, it is possible that modifications and improvements will occur to those skilled in the art which are within the scope of the appended claims.

What is claimed is:

1. A method of providing cooperative control of irrigation between an operator having direct supervision of at least one irrigation station and management located remote to said at least one irrigation station, said controlled irrigation to occur at said at least one irrigation station having at least one head in relation to soil and plant material to be irrigated, wherein said irrigation is controlled by a control processor coupled to memory means, said control processor also being coupled to operator communication means, said control processor being located proximate to said at least one irrigation station, and said control processor capable of communicating with weather determining means and further capable of communicating with remote management communication means, said method comprising the steps of:

creating a historical weather data accumulation in said memory means that is based on historical weather data elements stored in said memory means;

loading a budget value representing a predetermined budget for a predetermined period in said memory means;

accepting an operator communicated irrigation-related value through said operator communication means;

determining at said control processor a projected water usage for said predetermined period based on said operator communicated irrigation-related value combined with said historical weather data accumulation; and determining at said control processor if said projected water usage will exceed said predetermined budget, whereby results of the determination of whether said projected water usage operator will exceed said predetermined budget is available through said operator communication means to the operator for consideration when directing water allocation to said plant material and said results are also available to the remote management through said remote management communication means so that the remote management may monitor and supervise any operator directed water allocation, thereby providing cooperative control of irrigation between an operator having direct supervision of at least one irrigation station and management located remote to said at least one irrigation station.

2. The method of claim 1, and further comprising the following steps:

creating a current weather data accumulation in said memory means that is based on current weather data elements communicated to said control processor, wherein said current weather data accumulation is a copy of said historical weather data accumulation but with at least one weather data element of said current weather data elements replacing at least one historical weather data element of said historical weather data elements;

determining a reference weather data amount at said at least one irrigation station selectively based on said historical weather data accumulation or said current weather data accumulation; and determining at said control processor a quantity of water to apply at said at least one irrigation station based on said reference weather data amount.

3. The method of claim 2, wherein said weather determining means uses evapotranspiration sensing means.

4. The method of claim 3, wherein said reference weather data amount is a reference evapotranspiration amount.

5. The method of claim 4, wherein said step of creating said current weather data accumulation comprises the following steps:

responding to a signal from said evapotranspiration sensing means, said signal indicating that a preselected amount of water has been measured as lost to evapotranspiration at said evapotranspiration sensing means;

converting said signal from said evapotranspiration sensing means into said current weather data element; and storing said current weather data element in said current weather data accumulation in said memory means.

6. The method of claim 5, wherein said step of converting said signal into said weather data element comprises the steps of:

incrementing a value representing a total amount of water evaporated in a predetermined time period if a preselected time criteria has not been satisfied; and storing said value as said current weather data element in said current weather data accumulation if said preselected time criteria has been satisfied.

7. The method of claim 4, wherein said step of determining a quantity of water to apply at said at least one irrigation station comprises the steps of:

storing in said memory means a predetermined percentage evapotranspiration ($\%ET_0$) factor based on plant material to be irrigated and an expected efficiency of said irrigation head; and determining a quantity of water to apply from said irrigation head based on said $\%ET_0$ factor combined with said determined reference evapotranspiration amount at said at least one irrigation station.

8. The method of claim 7, and further comprising the step of sending a signal to said operator communication means to indicate whether said quantity of water to apply is within said predetermined budget.

9. The method of claim 8, and further comprising the step of storing a record in said memory means to indicate to management located remote to said at least one irrigation station whether or not the operator has performed a corrective action if said projected water usage is not within said budget.

10. The method of claim 4, and further comprising the step of determining a total amount of run time of said irrigation head based on said quantity of water to apply at said at least one irrigation station combined with a predetermined application rate of said irrigation head.

11. The method of claim 10, and further comprising the steps of dividing said rim time into smaller intervals, and applying said determined quantity of water to apply in corresponding smaller quantities over said smaller time intervals such that said water is allowed to soak into said plant material between applications of said smaller quantities of said water.

12. The method of claim 3, wherein said evapotranspiration sensing means uses an atmometer.

13. The method of claim 2, wherein said current weather data elements are collected by remote data collection means.

14. The method of claim 1, and further comprising the step of sending a signal to said operator communication means to indicate whether said projected water usage is within said predetermined budget.

15. The method of claim 14, and further comprising the step of storing a record in said memory means to indicate to said management located remote to said at least one irrigation station whether or not the operator has performed a corrective action if said projected water usage is not within said budget.

16. An irrigation management and control system for providing cooperative control of irrigation between an operator having direct supervision of at least one irrigation station and management located remote to said at least one irrigation station, said controlled irrigation to occur at said at least one irrigation station having at a control valve and at least one irrigation head in relation to plant material growing in a predetermined area of soil, said system comprising:

a control processor coupled with memory means and further coupled with said control valve, said control processor being located proximate to said at least one irrigation station, and control processor capable of communicating with weather determining means;

operator communication means coupled to said control processor;

remote management communication means adapted to communicate with said control processor;

machine executed means coupled for issuing commands to said control valve for executing an operator request to apply an amount of water at said at least one irrigation station from said at least one irrigation head; and the machine executed means including means for allowing an operator to determine the distribution of an allocated water budget by:

creating a historical weather data accumulation in said memory means that is based on historical weather data elements stored in said memory means;

loading a budget value representing a predetermined budget for a predetermined period in said memory means;

accepting an operator communicated irrigation-related value through said operator communication means;

determining at said control processor a projected water usage for said predetermined period based on said operator communicated irrigation-related value combined with said historical weather dam accumulation; and determining at said control processor if said projected water usage will exceed said predetermined budget, whereby results of the determination of whether said projected water usage operator will exceed said predetermined budget is available through said operator communication means to the operator for consideration when directing water allocation to said plant material, and said results are also available to the remote management through said remote management communication means so that the remote management max monitor and supervise any operator directed water allocation, thereby providing cooperative control of irrigation between an operator having direct supervision of at least one irrigation station and management located remote to said at least one irrigation station.

17. The system of claim 16, wherein said machine executed means further comprises:

means for creating a current weather data accumulation in said memory means that is based on current weather data elements communicated to said control processor, wherein said current weather data accumulation is a copy of said historical weather data accumulation but with at least one weather data element of said current weather data elements replacing at least one historical weather data element of said historical weather data elements;

means for determining a reference weather amount at said at least one irrigation station selectively based on said historical weather accumulation or said current weather table; and means for determining a quantity of water to apply at said at least one irrigation station based on said reference weather amount.

18. The system of claim 17, wherein said current weather data elements are collected at evapotranspiration sensing means in communication with said control processor.

19. The system of claim 18, wherein said reference weather data amount is a reference evapotranspiration amount.

20. The system of claim 19, wherein said machine executed means further comprises means for creating said current weather data accumulation comprising:

means for responding to a signal from said evapotranspiration sensing means, said signal indicating that a preselected amount of water has been measured as lost to evapotranspiration at said evapotranspiration sensing means;

means for converting said signal from said evapotranspiration sensing means into said current weather data element; and means for storing said current weather data element in said current weather data accumulation in said memory means.

21. The system of claim 20, wherein said means for converting said signal into said weather data element further comprises:

means for incrementing a value representing a total amount of water evaporated in a predetermined time period if a preselected time criteria has not been satisfied; and means for storing said value as said current weather data element in said current weather data accumulation if said preselected time criteria has been satisfied.

22. The system of claim 19, wherein said means for determining a quantity of water to apply at said at least one irrigation station further comprises:

means for storing in said memory means a predetermined percentage evapotranspiration (%$ET_0$) factor based on plant material to be irrigated and an expected efficiency of said irrigation head; and means for determining a quantity of water to apply from said irrigation head based on said % $ET_0$ factor combined with said determined reference evapotranspiration amount at said at least one irrigation station.

23. The system of claim 22, wherein said machine executed means further comprises means for sending a signal to said operator communication means to indicate whether said projected water usage is within said predetermined budget.

24. The system of claim 23, wherein said machine executed means further comprises means for storing a record in said memory means to indicate to management located remote to said at least one irrigation station whether or not the operator has performed a corrective action if said projected water usage is not within said budget.

25. The system of claim 19, wherein said machine executed means further comprises means for determining a total amount of run time of said irrigation head based on said quantity of water to apply at said at least one irrigation station combined with a predetermined application rate of said irrigation head.

26. The system of claim 25, wherein said machine executed means further comprises means for dividing said run time into smaller intervals, and means for applying said determined quantity of water to apply in corresponding smaller quantities over said smaller time intervals such that said water is allowed to soak into said plant material between applications of said smaller quantities of said water.

27. The system of claim 18, wherein said evapotranspiration sensing means uses an atmometer.

28. The system of claim 17, wherein said current weather data elements are collected by remote data collection means.

29. The system of claim 16, wherein said machine executed means further comprises means for sending a signal to said operator communication means to indicate whether said projected water usage is within said predetermined budget.

30. The system of claim 29, wherein said machine executed means further comprises means for storing a record in said memory means to indicate to said management located remote to said at least one irrigation station whether or not the operator has performed a corrective action if said projected water usage is not within said budget.

31. A control apparatus for providing cooperative control of irrigation between an operator proving direct supervision of at least one irrigation station and management located remote to said at least one irrigation station, said controlled irrigation to occur at said at least one irrigation station having plant material growing in a predetermined area of soil at said at least one irrigation station, said at least one irrigation station having at least one irrigation head and a control valve, said apparatus comprising:

a control processor coupled with memory means and being located proximate to said at least one irrigation station, said control processor capable of communicating with weather determining means;

operator communication means coupled with said control processor;

remote management communication means adapted to communicate with said control processor;

means coupled with said control processor for creating a historical weather table in said memory means that is based on historical weather data elements stored in said memory means;

means coupled with said control processor for loading a budget value representing a predetermined budget for a predetermined period in said memory means;

means coupled with said control processor for accepting an operator communicated irrigation-related value through said operator communication means;

means coupled with said control processor for determining at said control processor a projected water usage for said predetermined period based on said operator communicated irrigation-related value combined with said historical weather data table; and means coupled with said control processor for determining at said control processor if said projected water usage will exceed said predetermined budget, whereby results of the determination of whether said projected water usage operator will exceed said predetermined budget is available through said operator communication means to the operator for consideration when directing water allocation to said plant material and said results are also available to the remote management through said remote management communication means so that the remote management may monitor and supervise any operator directed water allocation, thereby providing cooperative control of irrigation between an operator having direct supervision of at least one irrigation station and management located remote to said at least one irrigation station.

32. The apparatus of claim 31, and further comprising:

means coupled with said control processor for creating a current weather data table in said memory means that is based on current weather data elements communicated to said control processor, wherein said current weather data accumulation is a copy of said historical weather data table but with at least one weather data element of said current weather data elements replacing at least one historical weather data element of said historical weather data elements;

means coupled with said control processor for determining a reference weather data amount at said at least one irrigation station selectively based on said historical weather table or said current weather table; and means for determining a quantity of water to apply at said at least one irrigation station based on said reference weather data amount.

33. The apparatus of claim 32, wherein said weather determining means uses evapotranspiration sensing means in communication with said control processor.

34. The apparatus of claim 33, wherein said reference weather data amount is a reference evapotranspiration amount.

35. The apparatus of claim 34, wherein said means coupled with said control processor further comprises means for creating said current weather data accumulation comprising:

means for responding to a signal from said evapotranspiration sensing means, said signal indicating that a preselected amount of water has been measured as lost to evapotranspiration at said evapotranspiration sensing means;

means for converting said signal from said evapotranspiration sensing means into said current weather data element; and means for storing said current weather data element in said current weather data accumulation in said memory means.

36. The apparatus of claim 35, wherein said means for converting said signal into said weather data element further comprises:

means for incrementing a value representing a total amount of water evaporated in a predetermined time period if a preselected time criteria has not been satisfied; and means for storing said value as said current weather data element in said current weather data accumulation if said preselected time criteria has been satisfied.

37. The apparatus of claim 34, wherein said means coupled with said control processor for determining a quantity of water to apply at said at least one irrigation station further comprises:

means for storing in said memory means a predetermined percentage evapotranspiration (%$ET_0$) factor based on plant material to be irrigated and an expected efficiency of said irrigation head; and means for determining a quantity of water to apply from said irrigation head based on said % $ET_0$ factor combined with said determined reference evapotranspiration amount at said at least one irrigation station.

38. The apparatus of claim 37, and further comprising means coupled with said control processor for sending a signal to said operator communication means to indicate whether said projected water usage is within said predetermined budget.

39. The apparatus of claim 38, and further comprising means coupled with said control processor for storing a record in said memory means to indicate to management located remote to said at least one irrigation station whether or not the operator has performed a corrective action if said projected water usage is not within said budget.

40. The apparatus of claim 34, and further comprising means coupled with said control processor for determining a total amount of run time of said irrigation head based on said quantity of water to apply at said at least one irrigation station combined with a predetermined application rate of said irrigation head.

41. The apparatus of claim 40, and further comprising means coupled with said control processor for dividing said run time into smaller intervals and for applying said determined quantity of water to apply in corresponding smaller quantities over said smaller time intervals such that said water is allowed to soak into said plant material between applications of said smaller quantities of said water.

42. The apparatus of claim 33, wherein said weather determining means is an atmometer.

43. The apparatus of claim 32, wherein said current weather data elements are collected by remote data collection means.

44. The apparatus of claim 31, and further comprising means for sending a signal to said operator communication means to indicate whether said projected water usage is within said predetermined budget.

45. The apparatus of claim 44, and further comprising means coupled with said control processor for storing a record in said memory means to indicate to said management located remote to said at least one irrigation station whether or not the operator has performed a corrective action if said projected water usage is not within said budget.

* * * * *